United States Patent
Song et al.

(10) Patent No.: US 7,533,808 B2
(45) Date of Patent: May 19, 2009

(54) PRIVACY PROTECTED COOPERATION NETWORK

(76) Inventors: Yuh-shen Song, 19848 Turtle Springs Way, Northridge, CA (US) 91326;
Catherine Lew, 19848 Turtle Springs Way, Northridge, CA (US) 91326;
Alexander Song, 19848 Turtle Springs Way, Northridge, CA (US) 91326;
Victoria Song, 19848 Turtle Springs Way, Northridge, CA (US) 91326

( * ) Notice: Subject to any disclaimer, the term of this patent is extended or adjusted under 35 U.S.C. 154(b) by 442 days.

(21) Appl. No.: 11/351,282

(22) Filed: Feb. 8, 2006

(65) Prior Publication Data
US 2006/0239513 A1    Oct. 26, 2006

Related U.S. Application Data

(60) Provisional application No. 60/651,062, filed on Feb. 9, 2005.

(51) Int. Cl.
*G06K 5/00* (2006.01)
(52) U.S. Cl. ...................................... 235/380; 235/382
(58) Field of Classification Search ................. 235/492, 235/491, 486, 487, 380, 382, 382.5, 383, 235/375
See application file for complete search history.

(56) References Cited

U.S. PATENT DOCUMENTS

2003/0149623 A1 *   8/2003   Chen .......................... 705/14

* cited by examiner

*Primary Examiner*—Thien M Le
(74) *Attorney, Agent, or Firm*—Fulbright & Jaworski LLP

(57) ABSTRACT

A computerized method and apparatus are established to identify a subject of common interest among multiple parties without releasing the true identity of any subject. Furthermore, a computerized network provides different parties at different locations with a mechanism to conduct cooperative activities concerning such a subject of common interest without exposing that subject to possible identity theft.

17 Claims, 5 Drawing Sheets

Information of the Individual:

1. Last 5 Digits of the Social Security Number: XXX-XX

2. Last 2 Digits of the Year of Birth: XX

3. Last Digit of the Month of Birth: X

4. Last Digit of the Date of Birth: X

5. Government Issued Identification Document (please select one)
   ☐ Driver's license / State ID    ☐ Passport    ☐ Alien Registration
   ☐ Other _____

6. Last 4 Digits of the ID Number: XXXXX-X

7. Initials of the Individual's Name:
   First Name [ ]    Middle Name [X]    Last Name [ ]

8. Partial Address Information:
   Zip Code (Exclude the 1st) X[ ][ ][ ]    Street Number [_____]

Figure 4

Information of the Organization:

1. Last 5 digits of the Employer Identification Number (EIN):

☐ ☐ ☐ ☐ ☐
 x  x
       x

2 Initials of the Organization's Name (leave blank if not applicable):

| 1st Word | 2nd Word | 3rd Word | 4th Word | 5th Word |
|----------|----------|----------|----------|----------|
| ☐        | ☐        | ☐        | ☐        | ☐        |

3. Partial Address Information of the Organization

Street Number
☐

Zip Code (Exclude the 1st)
☐ ☐ ☐ ☐
 x

Country
☐ ▽

Figure 5

PRIVACY PROTECTED COOPERATION NETWORK

This application claims priority of U.S. provisional patent application No. 60/651,062 filed on Feb. 9, 2005, which is hereby incorporated by reference in its entirety.

FIELD OF INVENTION

The present invention relates generally to electronic communications concerning a particular entity without divulging the true identity of the subject individual, organization, or other legal entity. More specifically, the present invention involves a computerized method and apparatus for sharing information among multiple parties, each having information about identifiable entities of potential interest to the other parties, without disclosure of any private identification information not already known to the recipient.

BACKGROUND OF THE INVENTION

Privacy protection is a serious matter today. Many industries have established their privacy protection guidelines, rules, or regulations. In many cases, even government is involved.

For example, in the USA financial industry, the famous Gramm-Leach-Bliley Act ("GLB Act") requires financial institutions to keep all their customers' non-public personal information confidential. Non-public personal information also includes the identification information of the customers. Other countries have similar laws for privacy protection.

Although the GLB Act has a great purpose, it also forms a protection for con artists. For example, if a con artist commits a crime, such as check kiting, between Bank A and Bank B, it will be much easier to prevent this crime if Bank A and Bank B can jointly investigate this case at an early stage.

However, the chance for Bank A or Bank B to jointly investigate this case at an early stage is almost zero because, most likely, Bank A and Bank B may not know until it is too late that they have a common customer, who is using Bank A and Bank B to commit a financial crime.

It often requires a joint effort of multiple financial institutions to identify a possible crime at an early stage. The first step to forming this joint effort is to identify a common customer, who has suspicious activities. If a financial institution is not permitted to release the identification information of this suspicious customer, other financial institutions have no way to tell whether they have a common customer or not.

In theory, a financial institution should be able to determine whether any other financial institution may have a common customer, by simply posting the customer's identification information on a shared network and invite other financial institutions to compare this identification information with the identification information of their own customers. If there is a match, the matched person, organization, or entity is the common customer.

Although financial institutions are permitted to share information for the purposes of crime prevention under the section 314(b) of the USA PATRIOT Act or equivalent laws in other countries, most financial institutions do not take an advantage of these laws because they are afraid of violating the Gramm-Leach-Bliley Act in the USA or the equivalent laws in other countries. That is especially true if it is conceivable that the suspicious activities were perfectly innocent and the customer has not done anything that was illegal. Moreover, even if a customer had consented to the posting of the customer's identification information, it is not desirable to release the identification information of a customer because con artists could possibly obtain access to the posted identification information and use it to commit identity theft, which is one of the most common crimes today.

In other words, these conflicting requirements as established by different laws have placed financial institutions at a very awkward position. On one hand, there is an important need for financial institutions to identify a common suspicious customer in order to jointly prevent crimes. On the other hand, financial institutions are not permitted to release any identification information, even if it would assist the financial institution to identify a common suspicious customer.

In this document, the terminology "identification information" generally refers to a set of information that can be used to authenticate the identity of a subject person, organization, or other legal entity. For example, if the subject is a person, such information may include not only the person's name, but also one or more of that person's address, date of birth, identification document or instrument number, type of identification document or instrument, expiration date of identification document or instrument, social security number, driver's license number, etc.

In this document, the terminology "network" or "networks" generally refers to a communication network or networks, which can be wireless or wired, private or public, or a combination of them, and includes the well-known Internet.

In this document, the terminology "computer system" generally refers to either one computer or a group of computers, which may work alone or work together to perform certain system functions.

In this document, the terminology "computer network" generally refers to either one computer network or a group of connected computer networks, which may work alone or work together to perform certain network functions.

In this document, a "bank" or "financial institution" is generally referred to as a "financial service provider" and a "bank account" or "financial account" is generally referred to as an "account in a financial institution" or an "account with a financial service provider".

In this document, the terminology "financial institution" and "financial service provider" generally refers to either banks or non-banks which perform financial transactions (such as deposits, withdrawals, and transfers) involving payment instruments (such as cash, checks, credit cards, debit cards, monetary instruments, electronic fund transfers, etc).

In this document, the terminology "encoding" generally refers to any type of data manipulation so that an alphanumeric code is generated from a set of data through this data manipulation. The terminology "decoding" generally refers to the reverse data manipulation to transform the "encoded" data back to its original format. Not all encoded information can be decoded. Some coding schemes compress the information contained in the data, such that some information is lost during the encoding process. Sometimes encoding involves encryption which hides the information such that it cannot be decoded or otherwise made visible without access to a secret key.

SUMMARY OF THE INVENTION

One objective of the present invention is to readily identify a subject, in which multiple parties may have common interest, without violating the subject's privacy. Another more specific objective is to provide a networked method and apparatus which may be used to coordinate joint activities by two or more of those parties, having a common interest in the specific subject.

Although the invention may be best understood in the context of a specific example involving the identification of a common customer by multiple financial institutions that must comply with the Gramm-Leach-Bliley Act, many aspects of the invention may also be applicable for identifying a common person, organization or legal entity for other purposes.

Instead of using the actual identification information of a specific customer, the present invention may share only a set of "encoded" data ("identity code") that is derived from that identification information.

In accordance with one important aspect of the invention, if these two sets of encoded data exactly match each other, depending on the method of encoding, the original identification information of two subjects behind these two sets of encoded data should have an excellent probability to match each other, too.

In accordance with another important aspect of the invention, if crucial pieces of information are removed during the encoding process, accurate decoding of the original information becomes impossible. Thus, even if the encoding methodology is known, the recipient will be unable to recover the original identification information through a decoding process.

Moreover, in another embodiment, instead of using the actual identification information of a specific customer, the recipient receives only a set of "encrypted" data ("identity code") that is derived from that identification information, preferably using a known two-key form of encryption in which only the first key used to encrypt the data is shared, without disclosing the second key required to decrypt data into a usable format.

In theory, if these two sets of encrypted data exactly match each other, depending on the method of encryption, the original identification information of two subjects behind these two sets of encrypted data may have an excellent probability to match each other, too.

More importantly, if we purposely hide or destroy the key that is used for decryption, there may be no chance to recover the original identification information, even if the encrypted information in theory contains all the original information and in theory all the original information would be accessible to anyone having access to the decryption key. Thus, even if the key for encryption is known to the public, nobody may have any chance to recover the original identification information because the key for decryption is not available.

In a preferred embodiment, encryption is combined with encoding of partial identification information, such that even a person who with much effort and cunning illegally succeeds in decrypting the encrypted information, only partial identification information will be recovered and the chance for anybody to recover sufficient identification information to commit fraud or identify theft is practically zero.

To make sure that every financial institution can easily follow the same encoding and/or encryption method to derive the shared identity code from the customer's private identification information, so that matching process can be effectively performed, the present invention preferably uses a computerized method to prompt users to precisely follow the rules of encoding and/or encryption, or otherwise standardize and automate the process such that the same identification information will be encoded and encrypted in a consistent manner to produce the same results regardless of which user preformed the encoding and/or encryption.

Once these financial institutions have learned that they have a matched identity code, they may have a common customer who has suspicious activities. These financial institutions can begin discussing the suspicious activities of the common customer privately and confidentially as permitted by law.

In the very unlikely event, if two different persons really turn out to have the same "identity code," it should soon be apparent to the involved financial institutions before any damage has been done. In any event, only those financial institutions with the presumably shared customer behind the common identity code will have access to corresponding actual identification information, and to the extent they do not exchange information until they have established that the common identity code does not belong to two different individuals (for example, by sharing information about some other pieces of identification information not used to construct the identity code, such as place of birth or mother's maiden name), the actual identification information used by one financial institution to construct the identity code for one of its customers will remain protected even from the other financial institution.

Moreover, this common identity code will be essentially meaningless to any other third parties. Even if a computer hacker breaks into the computer database which stores these identity codes, he/she will have great difficulty finding any meaningful information and thus will be unable to commit identity theft.

Consequently, the present invention provides the technology necessary to identify a common customer potentially associated with suspicious activities at more than one financial institution without violating the Gramm-Leach-Bliley Act.

Those skilled in the art will undoubtedly recognize that by using different encoding and/or encryption rules to select and encode and/or encrypt different pieces of the available identification information, there will be potentially many different ways to generate an "identity code" that achieves substantially the same objectives. These different ways to encrypt the identification information should not be construed as substantial deviations from the present invention, as hereinafter claimed.

BRIEF DESCRIPTION OF THE FIGURES

FIG. 4 is an exemplary screen layout of the computer system, which collects, encodes and/or encrypts a set of data to form an identity code for an individual.

FIG. 5 is an exemplary screen layout of the computer system, which collects, encodes and/or encrypts a set of data to form an identity code for an organization.

Figure 1:
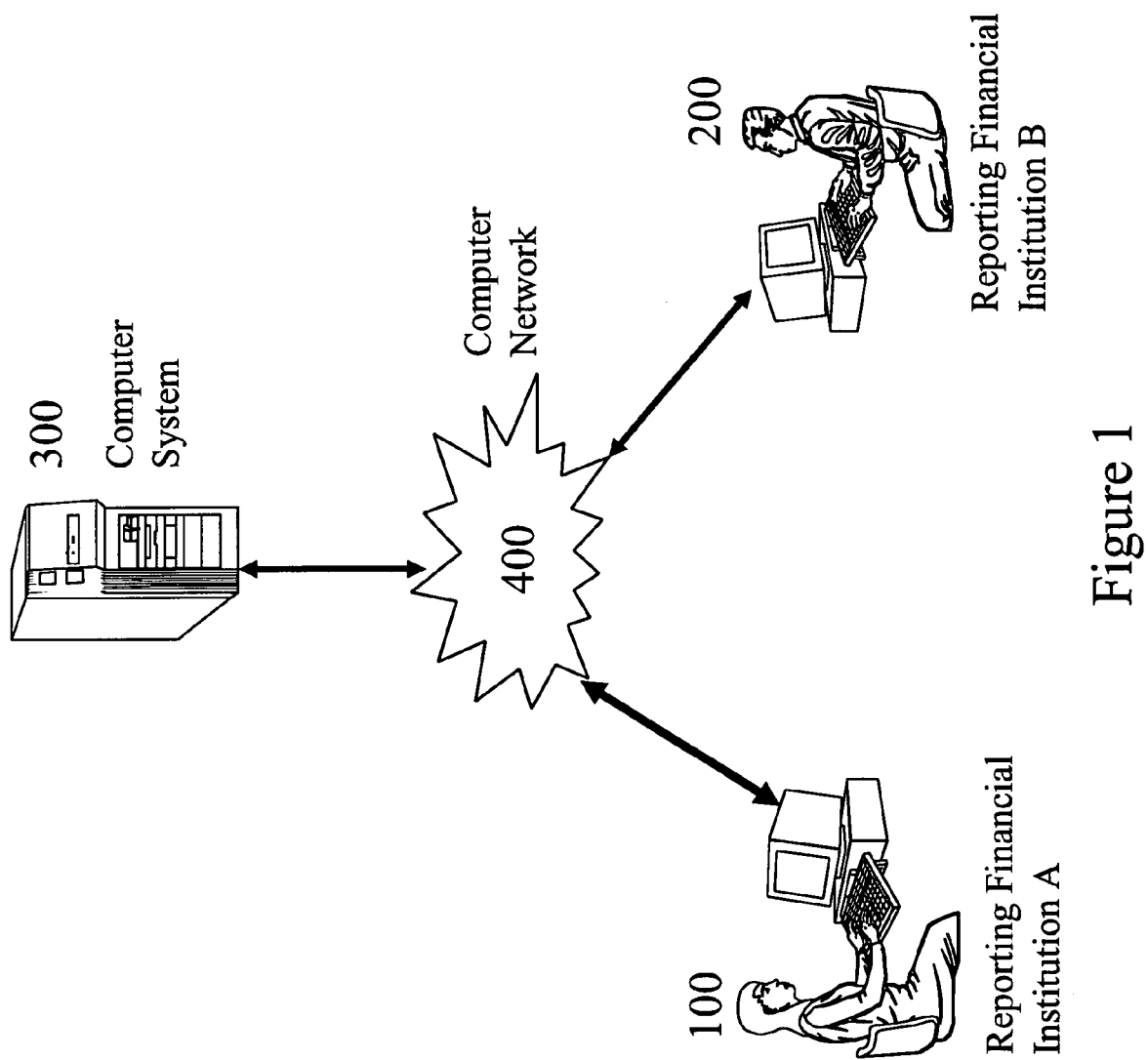
FIG. 1 is an exemplary system diagram with two parties (or, reporting financial institutions) connected to the computer system via a network.

DETAILED DESCRIPTION OF CERTAIN
PREFERRED EMBODIMENTS AND
COMBINATIONS OF EMBODIMENTS

The present invention potentially includes a number of embodiments to provide maximum flexibility in order to satisfy many different needs of both sophisticated and unsophisticated users. Accordingly, only a few examples of certain preferred embodiments of the present invention (and combinations of those embodiments) will now be described.

An individual is typically identified by his/her name and place of residence, preferably accompanied by a unique government issued identification number such as social security number, driver's license number, passport number, etc. However, partial identification information, such as the person's initials is far from being sufficient for identification purposes. Similarly, other partial information such as the last four digits of the social security number or driver's license number, the street number, last four digits of the zip code, the last digit of the month of birth, etc. are also insufficient for identification purposes.

Nevertheless, in one embodiment of the present invention, if several pieces of such unrelated practical identification information from the same subject are combined together through a pre-agreed data manipulation process, they form a set of encoded data, which can be used as an "identity code".

Similarly, in another embodiment of the present invention to provide higher security and privacy, an advanced encryption technique can also be used to encrypt the identification information to form an "identity code." If we purposely hide or destroy the key for decryption, there may be no chance to recover the identification information behind the identity code.

In yet another embodiment of the present invention, we can combine the above encryption with encoding of partial identification information to form an "identity code," the chance to recover the original identification information from this identity code is practically zero.

Although it is not possible to decode and/or decrypt an identity code to obtain the original identification information, two matched identity codes will signify that the original identification information of two subjects, which both correspond to this matched identity code, may match each other with a very high probability.

For example, the probability for two persons to have the same last five digits in both the social security number and driver's license number is 1 out of $10^{10}$ or 1 out of ten billion. The probability for these two persons to also have the same last two digits for year of birth is 1 out of $10^{12}$ or 1 out of one trillion. Furthermore, if these two persons also have the same zip code, the probability will become 1 out $10^{17}$ if these different types of information are statistically independent, which practically may never happen. By combining these pieces of information together through a pre-agreed data manipulation process, we can construct a set of encoded data, which becomes an "identity code."

Similarly, if we encrypt a sufficient amount of identification information to form an "identity code," the chance for two persons to have the same identity code can be reduced to almost zero.

At the same time, no third parties can understand the true identity behind this identity code; and thus the privacy of the person is preserved.

An analogous encoding and/or encryption of partial identification information can be used to identify an organization, or any other legal entity, while at the same time maintaining privacy.

A pre-agreed rule or set of rules is used to select, encode and/or encrypt the pieces of partial identification information from a specific subject individual, organization, or other legal entity, to form an identity code, which is essentially unique to that subject and which conceptually serves as a public proxy for that subject's private identification information.

In one embodiment of the present invention, the identity code is established based on a pre-agreed relatively simple transformation of the private identification information such as a straightforward concatenation of only some specified individual digits and letters from the original identification information.

In another embodiment of the present invention, the identity code is established through a pre-agreed relatively complex transformation of the specified digits and letters. The transformation could include known methods of data encryption and encoding of the selected pieces of the identification data, thus further protecting the privacy of the original identification information from unauthorized access.

Moreover, since only a small and relatively meaningless portion of the private information is used to generate the identity code, even if that portion is recovered by a malicious third party, the privacy of the remaining identification information will still be preserved and it will not be possible to steal the identify of the concerned subject.

In one embedment of the present invention, a networked computer has a database, which stores the identity codes of many subjects of potential interest. In addition, for each specific identity code, the computer also stores the contact information of all the parties which may have information concerning or otherwise be interested in the subject that is represented by such a specific identity code.

In that embodiment, a user of the present invention logs into the computer via the network and requests the computer to determine whether its database may contain a specific identity code, which the user is interested in. If the computer locates the specific identity code that the user is interested in, the computer can provide contact information of those parties, which may have a common interest in this specific identity code. As a result, the user can contact these parties and coordinate their efforts regarding the common subject that is represented by the specific identity code.

In another embodiment of the present invention, a user logs into the computer via network and requests the computer to provide a list of identity codes previously determined to be associated with suspicious individuals or otherwise responsive to a specific criteria provided by the user.

Once the user has obtained such a list of identity codes, the user compares its own database with this list and determines whether its own database may contain any subject, which may have the same identity code as the list has. If any identity code on the list that also exists in the user's database, the user may request the computer to provide contact information of all parties, which may have a common interest in said identity code. As a result, the user can contact those parties and coordinate their efforts regarding the common subject, which is represented by said identity code, without disclosing any identification information about the user's own customer that is not already known to the other users.

As contemplated in certain described embodiments, two financial institutions A & B are using the computer system 300 as shown in FIG. 1 to identify common customers, who may have suspicious activities.

Figure 2:
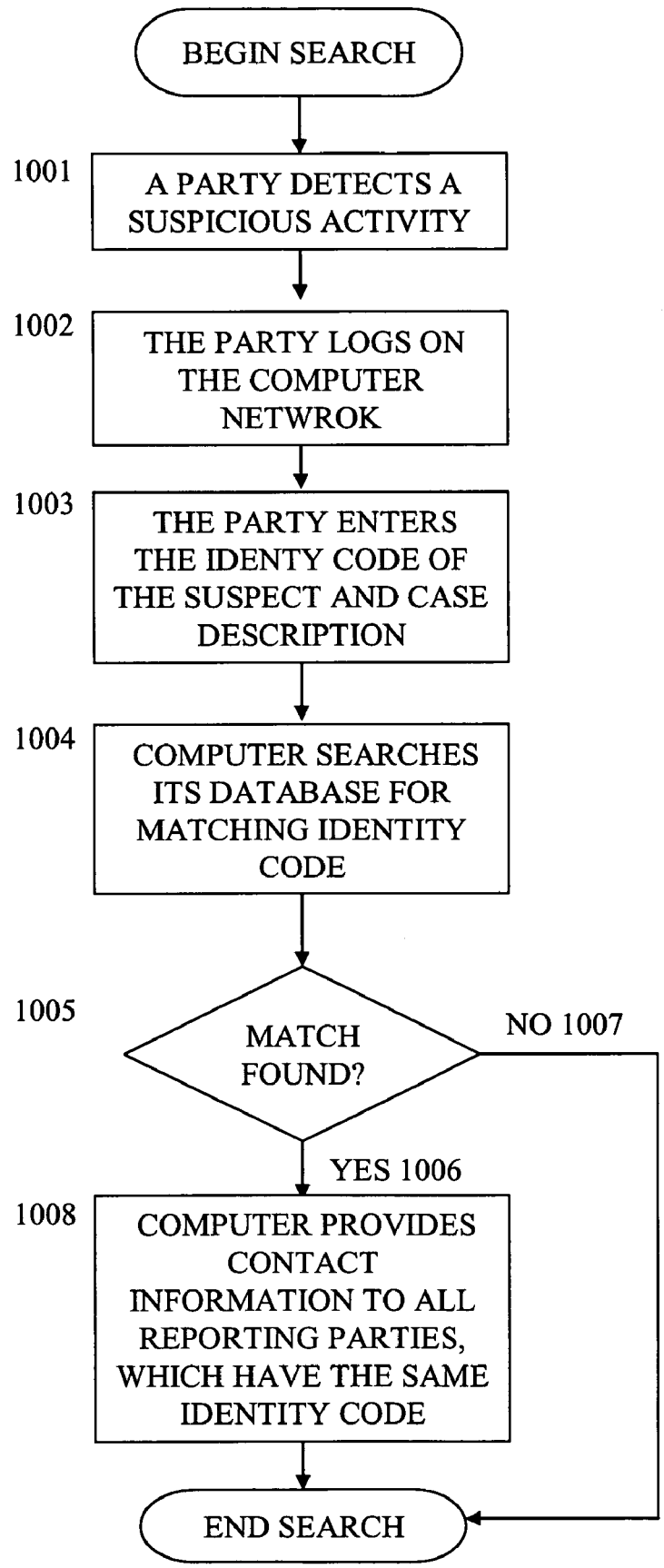
FIG. 2 is an exemplary flow chart showing how a party can log into the computer system, search for a common suspect, and obtain contact information to perform a joint investigation of suspicious activities of this suspect, using the computer system shown in FIG. 1.

References should now be made to the flowchart of FIG. 2 in combination with the system diagram of FIG. 1, which together illustrate how Reporting Financial Institution A 100 uses the computer system 300 to search for a suspect, relating to whom Reporting Financial Institution A 100 has detected suspicious activities (block 1001).

Then (block 1002), Reporting Financial Institution A 100 logs into the computer system 300 via network 400.

Reporting Financial Institution A 100 is prompted to form the identity code of the suspect and the case description into the computer system 300 (block 1003). The case description may include the category, the dollar amount, location, time frame, etc. of the suspicious activities.

FIG. 4 is an exemplary screen layout for the computer system to collect information from the user to form an identity code of an individual. FIG. 5 is an exemplary screen layout for the computer system to collect information from the user to form an identity code of an organization.

The computer system 300 searches its database to identify whether there is any existing case that has a matching identity code (block 1004).

After the search, the computer system 300 determines whether there is any match (decision block 1005). If a match is found ("YES" branch 1006 from decision block 1005), the computer system 300 informs Reporting Financial Institution A 100 of other parties that have reported the same identity code before (block 1008).

In general, two individuals or organizations are classified as "matched" if they have the same identity code, which is an encoded and/or encrypted form of numerical digits and letters collected from the identification information of the individuals or the organizations.

If Reporting Financial Institution B 200 has reported the same identity code before, the computer system 300 will also inform Reporting Financial Institution B 200 of the matching identity code and the contact information of Reporting Financial Institution A 100 via e-mail, fax, or other media, so that Reporting Financial Institution A 100 and Reporting Financial Institution B 200 can contact each other for a joint investigation.

On the other hand, if a match is not found ("NO" branch 1007 from the decision block 1005), no action may be necessary. The computer 300 system may then keep the identity code reported by Reporting Financial Institution A 100 for future comparisons.

Figure 3:
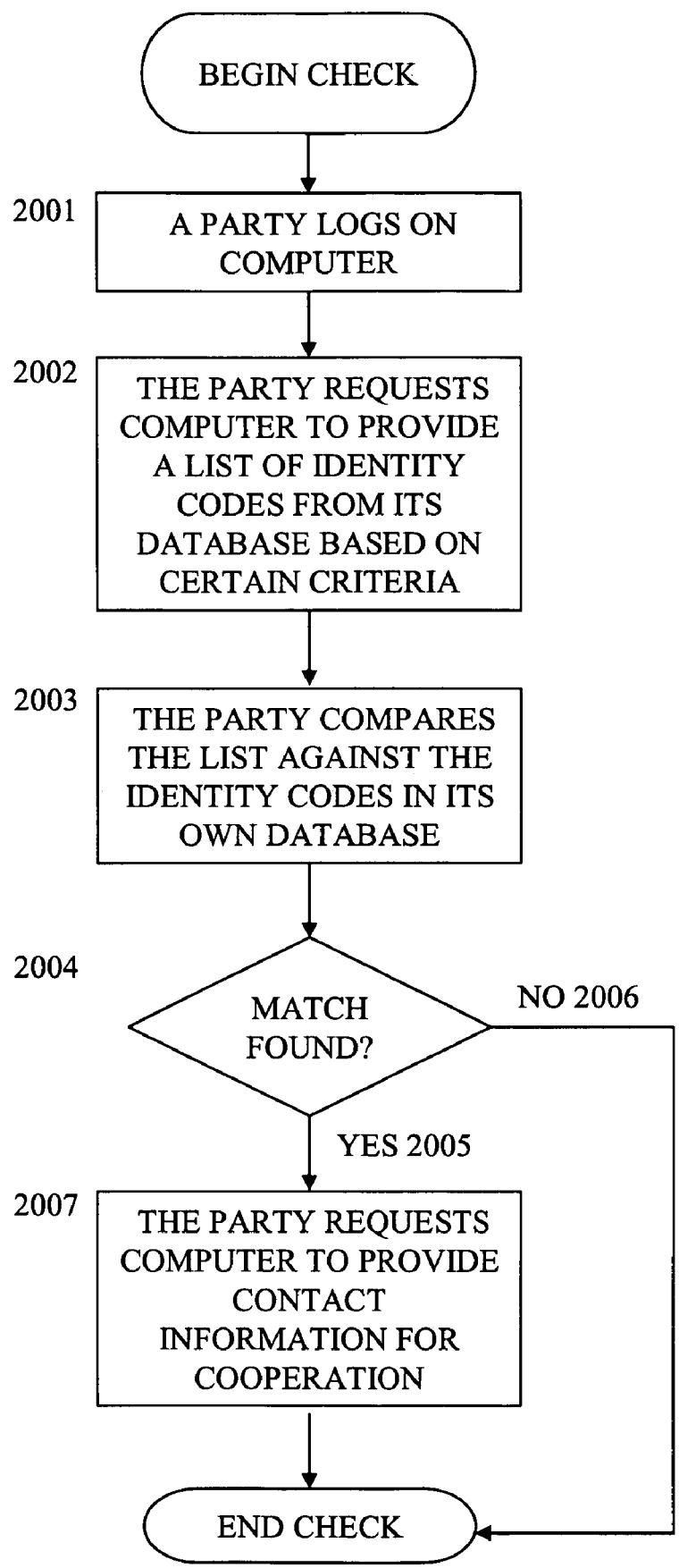
FIG. 3 is an exemplary flow chart showing how a party can obtain a list of identity codes and the party can then use that list to screen its existing database (e.g. customer database), using the computer system shown in FIG. 1.

References should also be made to the flowchart of FIG. 3 in combination with the system diagram of FIG. 1, which together illustrate how Reporting Financial Institution A 100 uses the computer system 300 to check whether it has any customer, who also has a record in the computer's database.

First (block 2001), Reporting Financial Institution A 100 logs into the computer system 300 via network 400.

Then (block 2002), Reporting Financial Institution A 100 requests the computer system 300 to provide a list of identity codes based on certain criteria.

For example, the criteria can be "Please list the identity codes of all suspects in the commercial loan category for suspicious activities reported from users in the State of Texas with dollar amount above $250,000 during Jul. 2001 to May 2004."

After receiving the list (block 2003), Reporting Financial Institution A 100 compares the identity codes of its customers against this list provided by the computer system 300.

Reporting Financial Institution A 100 will take two different actions based on whether there is any match between the identity codes on the list and the identity codes of its customers (decision block 2004).

If there is no match ("NO" branch 2006 from the decision block 2004), the check is complete.

If there is a match ("YES" branch 2005 from the decision block 2004), Reporting Financial Institution A 100 can request the computer system 300 to provide more information about the matching identity code and the other reporting parties, which have reported the same identity code before (block 2007). A joint activity can be established among Reporting Financial Institution A 100 and other reporting parties to reach a particular purpose.

Those skilled in the art will undoubtedly recognize that the described embodiments can be assembled in various ways to form a variety of applications based on the need, and that obvious alterations and changes in the described structure may be practiced without meaningfully departing from the principles, spirit and scope of this invention. Accordingly, such alterations and changes should not be construed as substantial deviations from the present invention as set forth in the appended claims.

The invention claimed is:

1. A computerized method for using a shared computer network to determine whether multiple parties may have a common interest in the same subject, without disclosing any private identification information concerning a specific subject to a party not already in possession of that private information, comprising:

collecting from one party an "identity code," which is established by at least one pre-agreed rule of encoding alpha-numerical characters selected from only a portion of the identification information known to that one party concerning a subject of possible common interest to other parties, in which said identity code cannot be used to recover said identification information;

reporting said identity code to the shared computer network for storage in a networked database together with the contact information of the reporting party;

using a processor to compare said identity code with other identity codes from other parties that have been reported and stored in the networked database; and informing all parties, which have reported the same identity code, of the contact information of the other reporting parties so that these reporting parties can contact one another for further cooperation regarding the subject of possible common interest.

2. The method of claim 1 wherein:

the identity code is established by means of a pre-agreed data encryption of at least a portion of the identification information of the subject.

3. The method of claim 2 wherein:

at least one key component for decryption is withheld from the recipient whereby the original identification information cannot be recovered.

4. The method of claim 3 wherein:

the encryption process uses a first key to encrypt the data and a second key to recover the unencrypted; and only the first key is shared with the party not already in possession of the identification information.

5. The method of claim 1 wherein:

the identity code is established by means of a pre-agreed data encryption of encoded alpha-numerical characters selected from only a portion of the identification information of the subject.

6. The method of claim 5 wherein:

at least one key component for decryption is withheld from the recipient whereby the original identification information cannot be recovered.

7. The method of claim 6 wherein:

the encryption process uses a first key to encrypt the data and a second key to recover the unencrypted; and only the first key is shared with the party not already in possession of the identification information.

8. The method of claim 1 wherein:

the subject is a person.

9. The method of claim 1 wherein:

the subject is an organization.

10. The method of claim 1 wherein:

the subject is a legal entity.

11. The method of claim 1 wherein:
the identification information for at least one of said subjects includes multiple types of information selected from the group consisting essentially of person's name, address, date of birth, tax identification number, type of identification document or instrument, number of identification document or instrument, country that issues the identification document or instrument, state that issues the identification document or instrument, government organization that issues the identification document or instrument, expiration date of identification document or instrument, phone number, e-mail address, and biometrical information.

12. The method of claim 11 wherein:
the identification document is selected from the group consisting essentially of driver's license, stale-issued identification card, passport, alien identification card, and publicly accepted identification document.

13. The method of claim 11 wherein:
the identification instrument is selected from the group consisting essentially of credit card, debit card, and publicly accepted identification device.

14. The method of claim 1 wherein:
the identification information for at least one of said subjects includes multiple types of information selected from the group consisting essentially of organization's name, organization's address, tax Identification number, date of issuing the license, type of license, country that issues the license, state that issues the license, government organization that issues the license, identification number of the license, and expiration date of the license.

15. The method of claim 1 wherein:
the reporting party is selected from the group consisting essentially of a person, an organization, and a legal entity.

16. The method of claim 1 wherein:
the further cooperation concerns activities selected from the group consisting essentially of identifying a suspicious subject, identifying a subject that is prohibited from participating in certain activities, identifying a subject that is welcome to participate in certain activities, identifying a subject that the reporting party intends to find more information, identifying a subject that the reporting party is searching for, and identifying a subject that the reporting party has an interest in for any reason.

17. The method of claim 1 further comprising:
permitting a party to log into the shared computer network and download a list of identity codes from the database based on certain criteria for at least one particular purpose;

comparing the downloaded identity codes with corresponding identity codes derived from identification information in said party's private database;

identifying any matched identity codes included in both the downloaded identity codes and the derived identity codes; and obtaining from saud shared computer network the contact information of those parties, which have reported to the computer system the matched identity codes.

* * * * *